July 22, 1941.  G. KODAL  2,249,901

INCLINOMETER

Filed Sept. 11, 1939

INVENTOR.
Gustav Kodal
Stephen Cerstvik
BY
ATTORNEY.

Patented July 22, 1941

2,249,901

UNITED STATES PATENT OFFICE 2,249,901

INCLINOMETER

Gustav Kodal, Berlin-Siemensstadt, Germany, assignor to Siemens Apparate und Maschinen Gesellschaft mit beschränkter Haftung, Berlin, Germany, a corporation of Germany Application September 11, 1939, Serial No. 294,373
In Germany October 12, 1938

3 Claims. (Cl. 33—209)

This invention relates to inclinometers, and more particularly to such devices employing a liquid, the level of which, relative to a reference mark, indicates an inclination.

One of the objects of the present invention is to provide novel means of the above character which are rapidly and easily readable.

Another object of the invention is to provide a novel inclinometer employing a level indicating liquid wherein the accuracy of the indications are not influenced by meniscus formations of the liquid.

A further object of the invention is to provide novel means of the above character which are compact and light, therefore well adapted for use in aircraft for indicating the true or apparent horizon.

The above and further objects and novel features will more fully appear from the detailed description when the latter is read in connection with the accompanying drawing. It is to be expressly understood that the drawing is for purposes of illustration only and is not intended as a definition of the limits of the invention, reference for the latter purpose being had to the appended claims.

In the drawing, wherein like reference characters refer to like parts throughout the several views, Fig. 1 is a front elevation of one embodiment of the invention employed with a second indicating apparatus;

The form of the invention illustrated in the accompanying drawing, by way of example, comprises a disc-shaped container in which a desired quantity of liquid is held, the level of which, relative to a suitable reference mark, may be viewed through a suitable transparent face plate. Means are provided for suppressing or preventing agitation of the fluid comprising fin members within the container. The inclinometer is here employed in combination with a gyroscopic turn or bank indicator in such a manner that a pointer operatively connected to the bank indicator is movable adjacent the above transparent face and readable simultaneously with the inclinometer.

Figure 5:
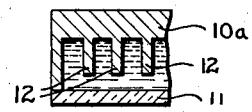
Fig. 5 is an enlarged, detail sectional view, with parts broken away, of the embodiment of Fig. 3.
Figure 4:
Fig. 4 is a plan view in section of the parts shown in Fig. 3.

In the figures a preferably flat disc-shaped container 10 of cylindrical contour in vertical cross-section is employed for holding the level indicating liquid, the container having a transparent face plate 11. Novel means are employed within the container for calming any turbulence in the liquid or preventing any agitation thereof comprising a plurality of fins 12 which are preferably concentric with one another and with the container. The fins are preferably fixed at the bases thereof to base 10a of the container, or are integral with said base. In order to avoid subdivision of the container into many concentric closed compartments without intercommunication, in which compartments meniscus formations might reduce the accuracy of the indicator, the fins are less in height than the inner thickness of the container (Figs. 4 and 5). For a purpose to appear later a central bore 13 is provided in the container, the latter being approximately one half full of the above-mentioned level indicating liquid.

Figure 1:
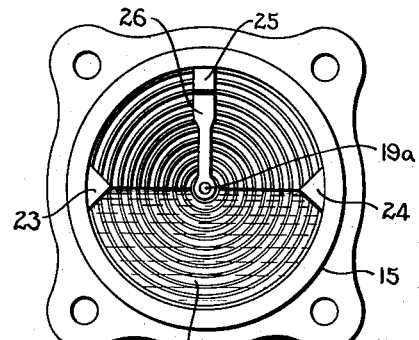
Figure 2:
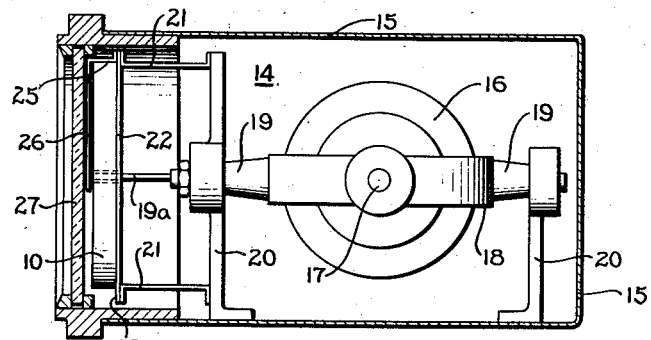
Fig. 2 is a side elevation partly in section of the embodiment of Fig. 1.
Figure 3:
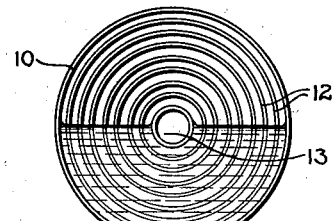
Fig. 3 is a front view of the level indicator alone of Fig. 1.

When the novel inclinometer is employed in vehicles such as aircraft, for example, for indicating transverse inclinations, it is highly desirable that said indicator be read substantially simultaneously with a suitable turn or bank indicator. In Figs. 1 and 2 the inclinometer is employed in combination with a gyroscopic bank indicator 14, within a common housing 15. The indicating apparatus 14 is constituted by a rotor 16 having normally horizontal trunnions 17 which rest in a conventional manner upon a gimbal frame 18. The latter is provided with trunnions 19 which in turn are supported upon shoulders 20. Suitable means (not shown) are employed for normally maintaining the axis of rotation of the gyro in a predetermined position, i. e., horizontal. The movements of the gyro therefore provide a measure of the angular velocity of a turn of housing 15 about the axis of sensitivity thereof which, in the embodiment illustrated, is perpendicular to the axes of trunnions 17 and 19.

Adjacent one extremity of housing 15 is mounted the inclinometer, for example, by means of brackets 21 secured to one of the shoulders 20. A suitable plate 22 is also held by said brackets, the plate having attached thereto reference markers 23, 24 for the liquid level, and a marker 25 for a pointer 26 of the bank indicator. Pointer 26 is mounted upon an extension 19a of a trunnion 19, the extension extending through the above-mentioned bore 13. Pointer 26 is thus concentric with the liquid level device and is readable approximately simultaneously therewith. An outer transparent cover 27 is provided for protecting pointer 26 and for sealing said common container 15.

In operation, since the axis of sensitivity of the gyro arrangement is perpendicular to the axes of trunnions 17 and 19, said axis is parallel to the vertical or normal axis of the aircraft, a left hand bank or curve of the craft will be indicated by a left deflection of pointer 26, and a right bank by a right deflection, thereby indicating the speed and direction of the turn. The liquid level provides at all times an accurate indication of the apparent horizon which is readable with the indications of the bank or turn device.

There is thus provided a novel "liquid level" which may be used in many fields for measuring inclinations. In devices of this character heretofore employed the area or length of the level of the upper surface of the liquid has been relatively small (for example, ring-shaped tubes have heretofore been employed) with the result that the indications have been difficult to read because of the meniscus formation of the liquid. By means of the present invention a relatively long liquid surface is provided, agitation is prevented and a meniscus formation is avoided whereby a correct indication may be quickly read. When employed in an aircraft the inclinometer may be used separately, if desired, but preferably the same is used in combination with the turn and bank indicator of the type described above so that the aviator may, at one reading, determine the speed and direction of the turn of the aircraft and the angle of inclination thereof to the horizon.

Although only one embodiment of the invention has been illustrated and described in detail it is to be expressly understood that the invention is not limited thereto. For example, the fins 12 are not necessarily concentric with one another or with the casing. Also, instead of having the height of fins 12 less than the inner altitude of the container, in order that the channels formed by the fins be in communication, suitable slots may be cut across said fins, for example, diametrically across, to establish said communication, the fins being equal in height to said inner altitude. Further, a colored liquid may be employed in the container. There also may be provided on the cover glass 27 two parallel reference lines between which the liquid level of the indicator can remain visible as long as the craft is in a horizontal position. Finally, an aircraft silhouette can be mounted in a conventional manner on the cover plate 11 or 27. Various changes may also be made in the design and arrangement of the parts without departing from the spirit and scope of the invention, as the same will now be understood by those skilled in the art. For a definition of the limits of the invention reference will be had primarily to the appended claims.

What is claimed is:

1. An aircraft instrument for indicating the true or apparent horizon, comprising an inclinometer having a disc-shaped housing, a plurality of fins within the housing, the fins being of less height than the thickness of the housing, and a transparent face plate for said housing, the latter being approximately one half full of a liquid, said fins acting to provide a substantially level liquid surface whereby meniscus formations at said surface are counteracted.

2. An inclinometer comprising a disc-shaped housing approximately one-half full of a liquid, a plurality of fins formed integrally with said housing on the interior thereof, the fins being of less height than the thickness of the housing, and a transparent face plate for said housing, said fins providing a substantially continuous level surface for said liquid.

3. An aircraft instrument for indicating the true or apparent horizon, comprising an inclinometer having a cylindrical housing approximately one-half full of a liquid, a plurality of concentric fins within said housing formed integrally therewith being of less height than the thickness of the housing to provide a substantially continuous level surface for said liquid within said housing, and a transparent face plate for said housing.

GUSTAV KODAL.